3,154,646
DISTRIBUTING LINE AND CONNECTOR ARRANGEMENTS FOR ELECTRIC POWER SUPPLY SYSTEMS
Marcel Jurca, La Garenne Colombes, Seine, and Jean L. A. Joly, Houilles, Seine-et-Oise, France, assignors to La Telemecanique Electrique, Seine, France, a French company
Filed Feb. 27, 1962, Ser. No. 175,912
Claims priority, application France, Mar. 16, 1961, 855,867
15 Claims. (Cl. 200—51.08)

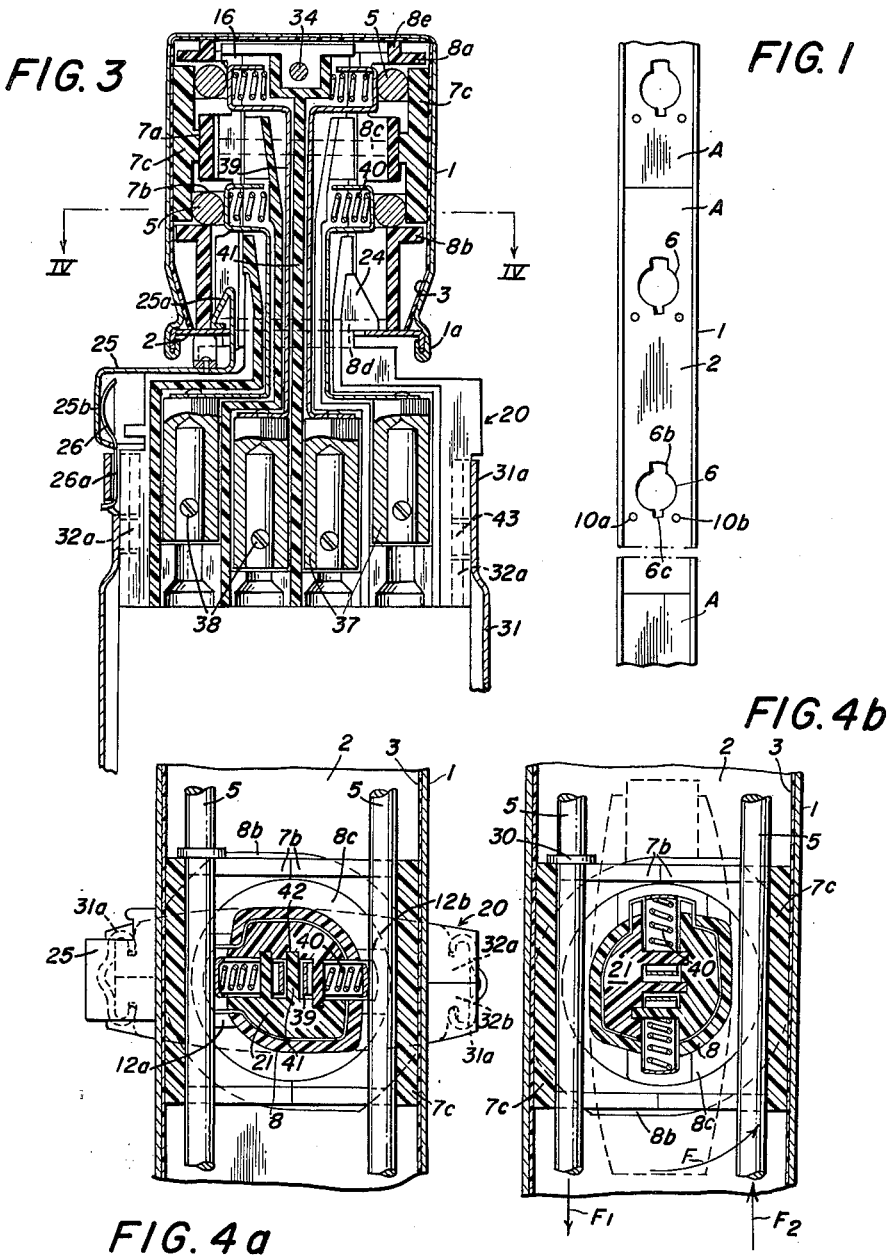

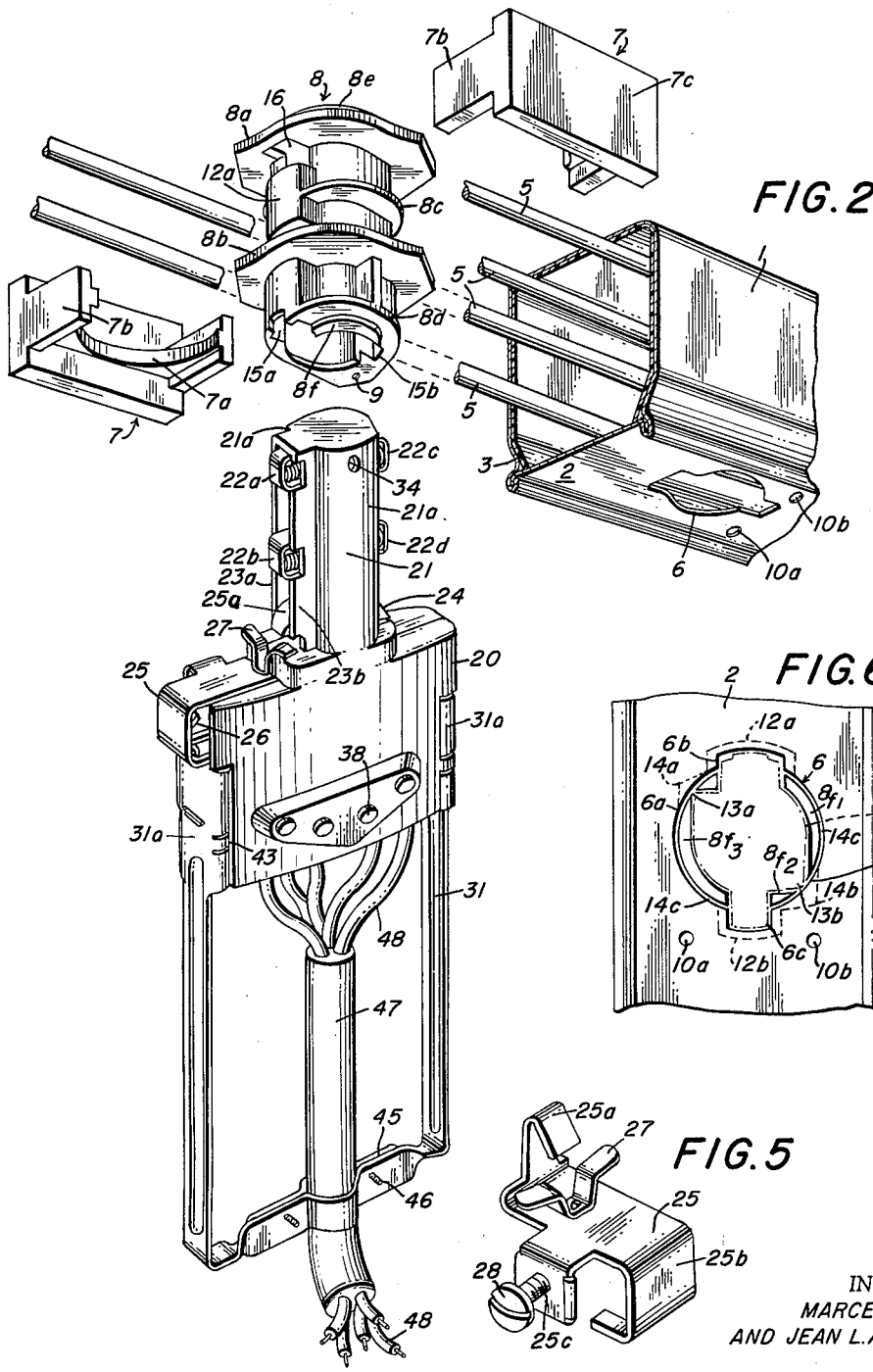

This invention relates to electric power supply systems of the type comprising a metallic tubular conduit or casing having power conductor bars extending therethrough, which bars are supported in spaced relation to the walls of the casing and to one another by means of insulators spaced along the length of the bars within the casing. Openings are provided in a wall of the casing for the insertion of connectors engageable with the conductor bars for effecting branch connections therewith to supply any of various units of electrical equipment as and where required.

The openings provided in the wall of the casing or conduit may be separate spaced openings, sometimes provided with individual cover means, or may be in the form of a continuous longitudinal slot. The connectors are in this case frequently provided in the form of T-shaped members of insulating material provided with contacts to which are connected leads having their other ends connectable with the unit of apparatus to be supplied. Such connectors are usually arranged to be first inserted into the slot opening of the casing and then rotated about 90° to a position in which the contacts thereof are in electrical contact with the respective conductor bars, thereby simultaneously locking the connector in the casing.

While such known arrangemens are generally convenient, they present certain serious drawbacks. The chief drawback is the possibility for an unauthorized person to insert a finger, or an ordinary tool such as a wrench or screw-driver into the opening of the casing and bring such finger or tool into direct electrical contact with one or more of the conductor bars with consequent risk of electric shock and/or short-circuiting. Also the longitudinal slot-like aperture permits considerable entry of dust and particles which, in workshops, are usually metallic so that their accumulation also constitutes a danger of short-circuit. It has been proposed to plug such longitudinal slots with rubber strips, or use pivoted flap covers or the like, but such arrangements are complicated and undesirable.

It is an object of this invention to provide an improved distributing line and connector arrangement for a power supply system of the general type described, wherein spaced openings are provided in the casing, which openings do not normally provided direct access to the conductor bars in the absence of a connector inserted thereinto, but which nevertheless permit of easily and quickly plugging a branch connection to said conductor bars by inserting and rotating the connector. Another object is to provide in such a system a plurality of spaced insulators in the casing, which serve to retain the conductor bars in spaced position therein, and which insulators moreover, normally prevent access to such conductor bars from the exterior of the casing but which can be individually rotated on insertion of a connector into an opening, to establish electric connections between the connector contacts and the bars. Other objects will appear.

According to the invention, an electric power supply system including means for effecting branch connections therewith, comprises in combination a generally tubular casing having a set of conductor bars extending therethrough, barrel-like insulators in the casing spaced longitudinally of it and having circumferential peripheral formations engaging said bars for supporting them in spaced relation to the walls of the casing and to one another, each insulator being supported in the casing for rotation about an axis normal to said bars, an axial recess in each insulator and an opening in the casing aligned with each recess, apertures formed through the wall of the insulator and registerable with said conductor bars when the insulator is rotated to an operative angular position, a connector havnig a pin insertable through any one of said openings in the casing into the axial recess of a related insulator and having means drivably engageable with said recess to permit rotation of the insulator by means of the connector, and contacts on the connector pin resiliently projectable through said apertures for electric engagement with the conductor bars when said insulator has been rotated to said operative angular position According to a preferred further arrangement, the cross sectional shape of the axial insulator recess and casing opening, as well as the complementary shape of the connector pin, are such that the pin can be inserted through said opening into the recess only when the insulator is rotated to an idle angular position angularly displaced from said operative angular position, and in which idle position the insulator apertures are displaced from said conductor bars.

Thus with the arrangement of the invention, in order to bring a contact of the connector pin into electrical engagement with a corresponding conductor bar, it is necessary to rotate the generally barrel-shaped insulator by means of the connector inserted into it, from the idle to the operative angular position. When a connector has been withdrawn, the internal axial recess of the insulator, which is accessible from outside, presents an entirely insulating surface since the apertures of it are not positioned in register with the conductor bars, so that no unauthorized tampering is possible and there is no danger of shock or short-circuit.

An exemplary embodiment of the invention will now be described in detail for purposes of illustration but not of limitation with reference to the accompanying drawings, wherein:

FIG. 1 is a small-scale plan view from below showing a length of the improved power supply conduit;

FIG. 2 is an exploded perspective view of the components of the system;

FIG. 3 is a cross section on a plane normal to the direction of the conductor bars and through the axis of an insulator with a connector inserted in active position;

FIGS. 4a and 4b are sections on line IV—IV of FIG. 3, with an inserted connector in the operative and idle positions respectively;

FIG. 5 is a perspective view of a latching element; and

FIG. 6 is a plan view of an opening in the casing.

There is illustrated in FIG. 1 an electric power conduit made up of a plurality of sections A assembled end to end. Although only a straight length of such conduit has been shown, it may obviously comprise bends, branches, and the like.

Referring to FIGS. 2 and 3, each section A comprises a sheath or casing section 1 formed from a metal strip element bent to channel form and a flat strip 2 sealing the open side of the channel, and assembled to the latter by having the margins 1a of element 1 crimped inwardly about flanged margins of the flat cover strip 2. Clearly other means of assembly may be used. The main or channel portion 1 is preferably lined internally with an insulator sheet 3 formed to a complementary channel shape.

In the illustrated embodiment the sheath or casing contains four separate conductors 5 in the form of round bars or rods bare of insulation. While the number of such conductors may be less or more than that shown depending on the application, four conductors are suitable in the practically important cases where the system is used in connection with a three-phase power supply line having an insulated neutral conductor.

The flat cover 2 of each casing section is formed with one or more cutouts 6. In the example shown (FIG. 1) each cover strip 2 is formed with two longitudinally spaced cutouts 6 so disposed that all the cutouts in the assembled sections are equally spaced longitudinally. Each cutout 6 is of the shape shown, including two complementary opposite arcuate edge portions separated by notches 6b, 6c for a purpose later explained. Positioned in the casing, adjacent each of the cutouts 6, is an insulating supporting structure which is made up of two similar, symmetrical portions 7 (see exploded view, FIG. 2). Each portion 7 comprises a flat outer wall 7c adapted to mate with a related side wall of the channel 1, a pair of side arms 7b projecting from the ends of wall 7c towards the other, symmetrical, portion into mating engagement with the ends of the corresponding side arms 7b of said latter portion, and a transverse web defining a semi-circular seating recess 7a, such that the seating recesses 7a of both symmetrical sections 7, in assembled condition, combine to define a circular bearing aperture. This aperture receives a barrel like insulator member 8 for rotatable adjustment therein.

Each of the insulator members 8 constitutes in effect a recessed, cylindrical insulator for supporting the conductors 5 within the sheath. A member 8 is formed with a number of radial flanges projecting outwardly from it. More specifically, each insulator member has the pair of spaced flanges 8a and 8b of largest radial size, which serve as supports for the conductor rods 5 and also (as will later appear) as means defining the limits of rotation of the insulator member; a circular flange 8c intermediate flanges 8a and 8b and adapted to seat rotatably within the bearing aperture 7a mentioned above; a lowermost flange 8d adapted to have its bottom end face seated in engagement with the surface of cover 2; and an uppermost circular flange 8e (FIG. 3) engaging the inner surface of the adjacent wall of channel 1.

Lowermost flange 8d is formed with a radial enlargement in which is formed a hole 9 adapted to cooperate with either one of two spaced projections 10a and 10b formed on the inner surface of cover strip 2 (e.g. by punching the outer surface of said strip), for resiliently retaining the members 8 in each of two angular positions as will presently appear. It is found that the desired resilient retaining action can readily be obtained, with the structure shown, simply by the inherent resiliency of flange 8d and strip 2 without requiring any additional spring means.

Each insulator member 8 at its lower end is formed with trunnion means 8f produced e.g. by turning said lower end of the member 8 on a lathe so as to provide a series of part-cylindrical surface portions $8f_1$, $8f_2$, $8f_3$ (see FIG. 6) adapted to cooperate with the arcuate portions of the related cutout 6, for seating the member 8 in the cutout in a manner more amply described hereinafter. When the members 8 are secured in position within the conduit by engagement of the trunnions 8f thereof in the related cutouts 6, they serve to brace the conduit transversely through the engagement of the upper flange 8e of the member 8 against the upper wall of channel 1, engagement of the lower flange 8d of the member 8 against the cover 2, and engagement of opposed flatted portions of each of the spaced flanges 8a and 8b against the side walls of the channel 1. Moreover the insulator 8 is rotatable about its axis, being guided in such rotation both by the engagement of trunnion portion 8f in the arcuate portions of the cutout 6, and engagement of circular flange 8c in bearing aperture 7a.

Further, with the insulators 8 in place, the conductor rods 5 are held in position in that they are blocked against vertical displacement by engagement between the facing surfaces of flanges 8a and 8b. It will be appreciated that these flanges 8a and 8b define a wide annular groove peripherally around the insulator member, and that on each side of the casing there is a pair of conductor rods 5 positioned adjacent the top and bottom of said groove, the two conductors in each pair being spaced apart in the vertical direction by the side arms 7b of the respective supports 7 (see especially FIG. 3). At the same time the conductors 5 are retained against displacement in the horizontal plane by the outer wall member 7c of a support portion 7 on one side, and by the cylindrical peripheral surface of the associated insulator 8 on the other side.

It will further be noted that the arms 7b and flanges 8a and 8b serve to divide the conduit 1 lengthwise into compartments, adjacent compartments being connected by passages of narrow size and intricate shape. This is effective in damping any arcs that may be struck between a pair of the conductors 5 positioned on a common (left or right) side of the casing 1, and that would otherwise tend to travel along said conductors. In this way damage caused by any such arcs is limited to a short length of the conduit.

Each cutout 6 in cover strip 2, as earlier indicated, is formed with a pair of diametrically opposed rectangular notches 6b and 6c aligned parallel to the length of the conduit. Notch 6b is wider than notch 6c for a reason to appear later. The insulators 8 are formed internally with a pair of diametrically opposed longitudinal grooves 15a and 15b corresponding in internal contour to that of said notches. The grooves 15a and 15b are formed in the inner surfaces of a pair of longitudinal ribs 12a and 12b formed on the outer sides of the insulator member. The internal contour of the insulator recess further includes (see especially FIG. 6) a pair of diametrically opposed reentrant angles 13a and 13b the apices of which are spaced a distance substantially equal to the diameter of the circular or arcuate portions 6a of the cutout 6.

The lower end (or trunnion) portion of each insulator member 8 has an external contour 14 which generally corresponds to the inner contour just described; thus it includes the pair of angular projections 14a corresponding to the reentrant angles 13a and 13b, the arcuate portions 14c and the afore-mentioned ribs 12a and 12b. The said ribs 12a and 12b are interrupted at the points corresponding to the positions of the conductor rods 5, thereby defining four apertures or "windows" 16 through the wall of the insulator, adjacent each of the four conductors.

A connector member 20 has a projecting end or pin 21 insertable through any one of the cutouts 6; the outer contour of said pin 21 (as shown in dashed lines in FIG. 6) is complementary to the internal contour of the insulator cavity. Thus the contour of pin 21 includes projecting angles 21a engageable in the reentrant angles 13a and 13b of the insulator cavity. Owing to such mating configuration, on the connector 20 being rotated as will presently be described, such rotation will be transmitted to the related insulator 8 through the mating surfaces including the sides of the angular portions 21a of the connector, rather than being transmitted through the more delicate electric elements of the connector, now to be described.

The connector pin 21 is provided along its opposite sides with spring contacts 22a, 22b, 22c, 22d positioned for engagement with respective ones of the conductor rods 5 when the connector is in position inside an insulator. The contacts 22a and 22b are positioned between a pair of spaced parallel insulator ribs or walls 23a, 23b of the connector pin. These ribs serve to provide a dissymmetry as between the two sides of the connector pin supporting, respectively, the pair of contacts 22a and 22b, and the pair 22c and 22d, preventing insertion of the connector in reversed position. Thus the contacts 22a and 22b positioned between the ribs 23a and 23b can only enter the wider cutout notch 6b and the wider groove 15a, while the contacts 22c and 22d can only enter the narrower cutout notch 6a and the narrower groove 15b. When the connector 20 is fully inserted each of the contacts 22a to 22d is positioned in register with an aperture 16.

Connector pin 21 further includes a wedge-shaped boss 24 positioned in alignment with the contacts 22c and 22d near the base of the pin. When the connector is inserted in place (see FIG. 3) the wedge shaped boss overlies the cover strip 2 to latch the connector in place. Opposite to boss or latch 24, i.e. in alignment with the contacts 22a and 22b, the connector pin 21 carries a sliding metallic detent element 25, shown in perspective in FIG. 5. The detent element is pressed by a leaf spring 26 (FIGS. 2 and 3) in an outward direction, and carries a detent nose 25a of a general wedge-shaped contour symmetrical with that of latch 24, and guided between the pair of ribs 23a and 23b. The detent nose 25a projects outwardly beyond the outer surfaces of contacts 22a and 22b, a distance greater than the distance by which latch 24 projects, so that on insertion of the connector, latch 24 can be inserted without interference in the notch 6c, while the detent nose 25a strikes the end wall of notch 6b during such insertion. Hence, on insertion of connector 20, the end wall of notch 6b on engagement therewith of the detent nose 25a, shifts the latch element radially inwards against the spring 26, and when it has moved past said notch end wall the detent nose 25a engages with the surface of cover strip 2 and locks the connector pin in its inserted position. To release the connector for withdrawal, finger pressure must be exerted on the detent 25, at the outer surface 25b thereof, to depress the detent against the action of its spring 26.

Secured to detent 25 as by welding or a rivet is a leaf spring 27 in the form of a U with open arms. When the detent nose 25a has been inserted into the notch as just described, the spring 27 is pressed against the outer surface of the conductive cover strip 2 thus providing a close electrical connection between the detent and casing. The detent element 25 has a terminal screw 28 threaded into a side lug 25c thereof, adapted for connection with a unit of electrical equipment, so that a ground connection is thus provided for said unit by way of the conduit structure 1–2.

With the connector in position in the insulator 8 as shown in FIG. 4b, the contacts thereof project into the apertures 16, and the diametric plane containing the center lines of the contacts lies parallel to the conductors 5. Moreover, the assembly comprising the connector and the insulator in which it is inserted is retained in place by cooperation of the afore-mentioned hole 9 with the locator boss 10a (FIG. 2). One of the pairs of straight sides or flats of the flanges 8a and 8b is in engagement through insulator sheet 3 with the flat sides of the casing 1. In this condition, if the connector 20 is gripped between one's fingers and turned, the connector and the insulator 8 are bodily rotated about their common axis, only one direction of rotation being possible which is that or arrow F in FIG. 4b. The apertures 16 are rotated to positions registering with the conductors 5 and the spring contacts of the conductor pin 21 which extend through said apertures, come into firm engagement with said conductor rods 5, so that each of the contacts 22a through 22d is under compression.

After the connector insulator assembly has rotated a quarter turn, the other pairs of flats provided on flanges 8a and 8b engage with the side walls of casing 1 (see FIG. 4a) while the arcuate portions of said flanges remain in contact engagement with the walls 7c and conductors 5 respectively, thereby retaining the conductors against transverse displacement. It will be noted that the angular amount by which the insulators can be rotated equals the angle formed between the straight or flat portions of flanges 8a and 8b. In FIGS. 4a and 4b said angle is shown as 90°, so that in this case the connector 20 would be rotated from an initial position parallel to the casing (as in FIG. 4b) to the position perpendicular thereto (as in FIG. 4a).

Because of the contact engagement of conductor rods 5 with the insulator member while the latter is being rotated in the direction shown by arrow F, the conductors tend to be carried along in the directions indicated by arrows $F_1$ and $F_2$, and in the reverse directions when the barrel is rotated in reverse. To prevent such longitudinal displacement of the conductors, stop rings 30 are shown secured to the conductors adjacent the arms 7b. For each of the conduit sections A (FIG. 1) it is sufficient to provide a stop ring positioned at each end of each conductor 5, each being applied against the adjacent support member 7, in order to prevent the longitudinal displacement of the conductor; this is sufficient in practice since only one of the insulators in a casing section is rotated at a time, so that the tendency to movement of the conductors is slight.

The connector pin 21, it will be noted, is shaped and behaves somewhat as a key, and the latch projections 24 and 25 behave in the manner of key bits or webs after they have been slipped past the cover 2. Thus, when the connector has been rotated (together with the insulator), the latch projections 24 and 25 cooperate with the arcuate portions 6a of cutout 6 to retain the pin 21 firmly locked in position, in a similar fashion to the way a key is blocked within a keyhole after it has been partly rotated after insertion into the keyhole. Conversely, the connector cannot be withdrawn before it has been restored to the idle position shown in FIG. 4b, with the contacts 22a–22d registering with the notches in the cutout; even then withdrawal can only be accomplished by disengaging the detent nose 25a as earlier described.

It will be apparent from the above that in the absence of the connector, it is practically impossible for an unauthorized person to contact the conductor bars 5 by inserting any tool or other object through the windows 16, since the apertures 16 extend parallel to the conductors 5. Before access to the inner recess of an insulator, through cutout 6, can become dangerous, the insulator would first have to be rotated deliberately by means of a tool resembling a key, a circumstance which obviously greatly restricts the hazard of electric shock to users and short-circuit within the conduit.

It will be seen moreover that the connector pin 21 may be provided with any desired number of contacts, e.g. three contacts in case connection with the three phase conductors of a three-phase system is required, or only two contacts for connection across one phase and neutral.

In the case of a conduit including a single level of conductor bars such as 5, the conduit may be provided with any desired cross sectional configuration, provided it includes a flat surface normal to the axes of insulators 8 and formed with the cutouts such as 6.

In the illustrated embodiment, the connector 20 comprises a body made up of two sections assembled by means of a screw 34 in the portion thereof comprising the pin 21, and a stirrup member 31 having flanged arms 31a, each crimped about complementary portions 32a and 32b (see FIGS. 3 and 4a) formed at the transverse ends of the molded body integrally therewith. As may be seen from FIG. 3, the flanged arm 31a on one side of the connector body serves to retain the leaf spring 26 associated with detent 25. For this purpose a portion 26a of the leaf spring is slipped in between the arcuate flanged arm 31a and the related portion 32a–32b of the body. To prevent the arms 31a from slipping off the body in a longitudinal direction (downwardly in FIG. 2), lugs 43 may be pressed from said flanged arms into recesses formed in the portions 32a and 32b.

As shown in FIG. 3, each half of the connector body is formed with four grooves which on assembly of the body portions cooperate to define four channels therethrough. Each of these channels or sockets receives a connector sleeve or jack 37 into which the bared end portion of an insulated conductor can be inserted to be clamped in place by means of a set screw 38. Further, each of the sockets 37 receives at its top end a bent end portion of a metallic strip 39 riveted thereto and the upper parts of which extend up into the connector pin 21 to provide the contact spring portions 22a through 22d, urged outwardly by springs 40.

To increase the length of the leakage paths between the respective conductors, the separating wall portions 41 (see FIGS. 4a and 4b) between adjacent sockets 37 are formed integrally with a single one of the two halves or sections of the connector body, and preferably project into narrow grooves 42 formed in the other section.

The stirrup member 31 has an arcuate indentation formed midway of its cross arm with which cooperates a similarly indented cover strip 45 attachable to the cross arm by means of screws 46 for clamping therebetween a cable 47 containing the individual conductors 48 which are to be connected to the conductor bars 5, the upper ends of the leads 48 extending into the sockets 37 as indicated above. The cable includes an additional, fifth, conductor 48 which is attached to the lug 25c of latching member 25 through screw 28 as earlier mentioned.

With the spring 27 being compressed against the casing on initial insertion of the connector 20 and before the connector has been rotated, the apparatus unit to be supplied by way of the conductor is grounded, such ground connection being established before the contacts 22a to 22d of the connector have engaged the live conductor rods 5, whereby danger of shock in case of an insulation fault in the system is averted.

As will be apparent from FIG. 2, the distribution system described is especially suitable for overhead installation from a ceiling or the like. The connector 20 when in service is firmly suspended from the conduit 1–2 by way of the latching parts 24 and 25a. However, additional means for removably securing the apparatus unit and/or the connector cable to the conduit may be provided if this is made necessary by the weight of the attachments. Alternatively, the conduit 1–2 may be positioned so that the cutouts 6 therein are in a vertical plane or are directed upwardly of the conduit. In such case, and also if desired in the arrangement here shown, pivoted or sliding covers may be provided for sealing the cutouts 6 against the ingress of objects.

In constructing the conduit sections of the system of the invention, the flat cover strips 2 are first disposed on a suitable mounting table, with their inner sides turned upwards. An insulator 8 is inserted into each of the cutouts 6, and then a row of support portions 7 are disposed to each side of the row of insulators 8, so as to correspond in number and in position to those of said insulators, and said support portions 7 are retained in position by clamping them between the pair of conductor bars 5 positioned on that side of the assembly. Thus by using both pairs of conductor rods 5 it is possible to juxtapose each pair of support sections 7, and the conductor bars 5 are simultaneously located in proper position with respect to the insulator. The insulator liner 3 is then positioned over the assembly, followed by the channel section 1, the side edges 1a of which have not yet been bent to their final shape. Finally the edges of the channel 1 are bent around the sides of the cover strip 2, the resulting assembly is inverted, and the side edges 1a are crimped around the edges of the cover strip.

It will be apparent from the foregoing description that the various objects of the invention are achieved principally by the provision of the novel barrel-like rotatable insulator members, which, in contrast to the insulators provided in prior systems of this type are rotatable. Moreover these insulator members of the invention serve a plurality of functions:

(1) They serve to brace and stiffen the casing;

(2) They serve to retain the conductor bars in their spaced relationship to one another and to the casing walls;

(3) They provide narrow gaps with the inner casing surface insulation so that any accidental short-circuit arcs that may occur between the conductor bars are arrested and cannot progress along the casing through such gaps;

(4) According to their chief function, the rotatable insulators prevent, in the absence of a connector inserted thereinto, access from the exterior to the conductor bars, and they simultaneously prevent ingress of dirt and foreign objects into the casing.

It will be understood that in addition to the single embodiment illustrated and described and the modifications expressly mentioned, a variety of other modified forms of the invention may be conceived without departing from the spirit and scope of the present invention.

What we claim is:

1. A distributing line and connector arrangement for a power supply system, comprising at least one tubular casing having at least a flat longitudinal surface provided with a plurality of longitudinally spaced keyhole-like apertures, barrel-like insulators arranged in said casing and each having one end face directed toward a respective aperture, each of said insulators having an axial recess of similar keyhole-like cross-section starting at said one end face, each of said insulators being provided with peripheral circular groove formations and with a plurality of lateral openings located, respectively, in the same planes as said peripheral circular groove formations and communicating with the latter and said recess, each of said insulators being adapted for limited angular displacement within said casing between a first position wherein said recess thereof is in registry with the associated aperture and a second position wherein said recess thereof is out of registry with the associated aperture while said openings are opposite to the side walls of said tubular casing, a set of parallel conductor bars extending lengthwise through said tubular casing, each of said bars engaging in a respective circular groove formation of the sequential insulators and being supported thereby, a connector member having a key-like pin selectively insertable in said apertures and the registering recesses, and spring-urged contacts protruding from said pin and located thereon for registering with said openings when said pin is inserted in said registering aperture and recess, whereby when said inserted pin and the associated barrel are simultaneously angularly displaced from said first position of the latter into said second position thereof, each of said contacts comes into engagement with a respective one of said conductor bars.

2. In a power supply system comprising a plurality of end to end connected tubular casings of substantially symmetrical cross-section each having a flat underface and being provided in the latter with a plurality of longitudinally spaced apertures, and a set of parallel conductor bars extending longitudinally through said casings; the combination of a plurality of similar and similarly arranged insulators in each casing, each of said insulators having an axis perpendicular to said underface and circumferential groove formations extending peripherally about said axis and receiving said bars, respectively, for supporting them in spaced relation, each of said insulators being provided with an axial recess registering with a respective one of said apertures of said casing, each of said insulators being further provided in the boundary surface of its recess with at least one flute extending parallel to said axis and intersecting said groove formations to define a plurality of openings establishing communication between said recess and said groove formations, means rotatably supporting each insulator in the associated casing for pivotal movement about its respective axis, a connector having a pin selectively insertable through each of said apertures into the registering recess for driving engagement with the associated insulator, and spring-urged contacts protruding from said pin and engageable into said flute for registering with said openings, whereby upon joint rotation of said pin and the insulator receiving the same said contacts extending through said openings may be brought to an operative position in which they engage said conductor bars, respectively.

3. The combination claimed in claim 2; said bars being of circular cross-section, the portion of each insulator including the peripheral groove formation having the external shape of a surface of revolution, and insulating facing half-bearings enclosing said portion of each insulator and abutting against the opposite inner walls of the respective casing, said bearings constituting parts of said supporting means for said insulators and cooperating with respective parts of the associated insulators to define said groove formations for supporting said bars in spaced relation to the casing walls and one another.

4. The combination claimed in claim 2; each of said insulators being provided in the boundary surface of said recess thereof with at least one additional flute extending parallel to said axis, and said pin having at least one longitudinal rib fitting into one of said flutes to enable rotary driving of said insulator by the inserted connector pin.

5. The combination claimed in claim 4; each of said apertures of said casing being of substantially the same shape as the cross-section of said recess, and said pin further comprising projections disposed in alignment with said contacts and adapted to cooperate with the inner face of the edge of the corresponding aperture of the casing for avoiding withdrawal of said connector at least in said operative position.

6. The combination claimed in claim 5; the radial extension of at least one of said projections being larger than the depth of the aperture portion corresponding to said rib-receiving groove, and said one projection being resiliently yieldable for enabling its movement past said aperture portion.

7. The combination claimed in claim 2, wherein said rotatable supporting means include cooperating surfaces of said casing opening and the adjacent end of the insulator.

8. The combination claimed in claim 2, wherein said rotatable supporting means incluude a peripheral circumferential flange of the insulator and a complementary circular bearing surface in said casing.

9. The combination claimed in claim 2, wherein said insulator recess and casing aperture have corresponding keyhole-like cross sectional contours registerable in an idle angular position of the insulator displaced from said operative position thereof, and said connector pin has a complementary key-like sectional contour whereby said pin can only be inserted into the recess when the insulator is in said idle position thereof.

10. The combination claimed in claim 9, wherein said connector pin contacts participate in defining said keylike sectional contour of the connector pin.

11. The combination claimed in claim 9, wherein said connector pin contacts participate in defining said keylike sectional contour of the connector pin, and wherein said keyhole-like contour of the recess and casing openings, and the complementary key-like contour of the connector pin, are asymmetrical to prevent inverted insertion of the connector pin.

12. The combination claimed in claim 2, wherein said peripheral formations on the insulator comprise radial flange means defining circumferential grooves for supportingly receiving said conductor bars.

13. The combination claimed in claim 2, including abutting surfaces peripherally of the insulator cooperating with inner surfaces of the casing to limit the angular displacement of the insulator about its rotational axis.

14. The combination claimed in claim 2, wherein said conductor bars extend through said casing on opposite sides of said insulators.

15. The combination claimed in claim 14, wherein said connector pin has contacts on opposite sides thereof for engagement with said conductor bars on opposite sides of the insulator.

References Cited in the file of this patent

UNITED STATES PATENTS

| | | |
|---|---|---|
| 2,134,753 | Fisher et al. | Nov. 1, 1938 |
| 2,637,790 | Woodside et al. | May 5, 1953 |
| 2,775,745 | Eaton | Dec. 25, 1956 |
| 2,938,976 | Wilson | May 31, 1960 |